3,847,856
PAPER COATING COMPOSITIONS
Gerhart Hermann Mueller, 7 An der Froschlache, and Kurt Wendel, 8 Beethovenstrasse, both of 6700 Ludwigshafen, Germany
No Drawing. Filed Sept. 25, 1972, Ser. No. 291,660
Int. Cl. C08f 29/50, 33/08
U.S. Cl. 260—29.6 RB                6 Claims

ABSTRACT OF THE DISCLOSURE

Paper coating compositions containing, as binder (A), mixtures of (a) emulsion polymers of major amounts of monovinyl aromatic monomers and
(b) emulsion polymers of major amounts of acrylates and/or methacrylates and/or
(c) emulsion polymers prepared in two stages from monovinyl aromatic monomers and acrylates and/or methacrylates, are particularly suitable for the manufacture of art paper if the amounts of polymerized units of monovinyl aromatic monomers and acrylates and/or methacrylates in the polymers (a), (b) and (c) together are such that a random copolymer containing said quantities of these monomers has a glass temperature of between −20° and +30° C.

---

This invention relates to paper coating compositions for the manufacture of art printing papers. More particularly, it relates to the type of synthetic binder contained in the paper coating compositions.

Although these binders are contained in the paper coating compositions in minor quantities usually of from 5 to 30% by weight based on the pigment, they substantially determine the processability and quality of the coated papers. The high working speeds of modern high-output coating processes in the paper industry necessitates a high solids content of the coating compositions to ensure that the drying capacity of the equipment is sufficient. Nevertheless, the paper coating compositions must show good flow and be resistant to mechanical stresses such as shear stresses and also have good pigment binding properties in the finished coating. Moreover, in many cases the coated papers are desired to show maximum gloss.

It has been known for many years to use aqueous dispersions of acrylate copolymers as synthetic binders either alone or together with natural binders such as starch, casein or soy protein. U.S. Pat. 3,081,198 and Belgian Pat. 655,981 also disclose the use of mixtures of acrylate copolymers and vinyl copolymers with acrylic acid/acrylate copolymers as synthetic binders for use in paper coating compositions.

Finally, paper coating compositions are known which contain, as binder, about 5 to 15% by weight, based on the pigments, of copolymers of styrene and acrylates used in the form of aqueous dispersions. Such binders have very good pigment binding properties but the gloss of the coated papers is often unsatisfactory even when the papers are calendered or treated with a highly polished roller in the high-gloss process. Another drawback of conventional binders used in paper coating compositions is that the ink receptivity of the coated papers falls relatively steeply when the gloss of the coated papers is improved by the usual methods, e.g. by calendering or brushing.

We have now found that coated papers of particularly high gloss may be manufactured using paper coating compositions which contain, for every 100 parts by weight of finely divided pigment, from 2 to 25 parts by weight of a synthetic binder comprising copolymers of monovinyl aromatic monomers and acrylates of $C_{2-12}$ non-tertiary alkanols and/or methacrylates of $C_{4-12}$ non-tertiary alkanols, provided that the binder fulfils the following conditions:

the binder is:

(A) a mixture of an emulsion copolymer (a) of from 65 to 100% by weight of a mixture of monovinyl aromatic monomers and from 0 to 20% by weight of said monomers of acrylonitrile, from 0 to 35% by weight of the acrylates and/or methacrylates defined above and from 0 to 10% by weight of olefinically unsaturated monomers containing reactive groups, with an emulsion copolymer (b) of from 80 to 100% by weight of the acrylates and/or methacrylates defined above, from 0 to 20% by weight of monovinyl aromatic monomers and/or acrylonitrile and from 0 to 10% by weight of olefinically unsaturated monomers containing reactive groups, and/or (B) a copolymer (c) which has been prepared in two stages and wherein monomers of copolymer (b) or (a) have been emulsion polymerized in an aqueous dispersion of a copolymer (a) or (b) respectively in the same quantities as those used in the manufacture of said copolymers (b) or (a), the proportions of copolymer (a) and copolymer (b) and the proportions of the first and second stages of copolymer (c) being such that the total quantities of monomers used are equal to the amounts of said monomers contained in a conventionally prepared random copolymer having a glass temperature of from −20° to +30° C.

The synthetic binder or binder mixture contained in the paper coating compositions is particularly suitable for use together with natural binders such as starch, casein or soy protein. Said natural products may be completely or partially replaced by synthetic binders differing from the copolymers (a), (b) and (c) of the invention.

Used in conjunction with a natural binder, the copolymer (c) and/or the mixture of copolymers (a) and (b) may be used in quantities ranging from 2 to 15 parts by weight and preferably from 3 to 12 parts by weight for every 100 parts by weight for every 100 parts by weight of pigment. In the absence of a natural binder, the amount of our binder used is from 5 to 25 parts and preferably from 7 to 15 parts by weight for every 100 parts of pigment. The total amount of binders should be between 5 and 30 parts and preferably between 7 and 25 parts by weight for every 100 parts of pigment.

The polymerized units of monovinyl aromatic monomers contained in copolymers (a), (b) and (c) are preferably styrene units. Other suitable monomers are α-methylstyrene and vinyl toluene. Thus suitable monovinyl aromatic monomers are generally those containing a benzene radical optionally substituted by alkyl, in particular methyl, in the o-, m- or p-position to the vinyl group. In the copolymer (a), part of the monovinyl aromatic monomers, i.e. up to 20% of their weight, may be replaced by acrylonitrile. Replacement of the monovinyl aromatic monomers by acrylonitrile is also possible in copolymers (b) and (c). The emulsion copolymers (b) are prepared using from 80 to 100% by weight of acrylates of $C_{1-12}$ non-tertiary alkanols or methacrylates of $C_{4-12}$ non-tertiary alkanols, i.e. primary and secondary saturated straight-chain or branched-chain aliphatic monoalcohols. The copolymers (b) also contain polymerized units of monovinyl aromatic monomers of the type mentioned above and/or acrylonitrile in quantities of up to 20% of the total weight of said copolymer (b). Suitable acrylates of $C_{1-12}$ and in particular $C_{3-8}$ alkanols are ethyl acrylate, n-butyl acrylate, isobutyl acrylate, n-hexyl acrylate, 2-ethylhexyl acrylate, n-octyl acrylate, n-dodecyl acrylate and the corresponding methacrylates. n-Butyl acrylate, isobutyl acrylate and 2-ethylhexyl acrylate are the preferred acrylates, whilst examples of suitable methacrylates are n-butyl methacrylate and 2-ethylhexyl methacrylate.

Suitable olefinically unsaturated monomers containing reactive groups, which may be incorporated as polymerized units in copolymers (a), (b) and (c) in proportions ranging from 0 to 10% by weight, are the usual auxiliary monomers, in particular from 0.1 to 10% and more particularly from 0.5 to 5% by weight of hydrophilic polar monomers such as monoethylenically unsaturated carboxylic acids of from 3 to 5 carbon atoms and/or their amides, mono- and di-N-alkylamides, N-methylolamides or etherified N-methylolamides, e.g. acrylic acid, methacrylic acid, crotonic acid, maleic acid, fumaric acid, itaconic acid, acrylamide, N-methylolacrylamide, N-methylolmethacrylamide, or maleic amide, maleic diamide, maleic half ester and itaconic half ester. Particularly suitable monomers of this kind are acrylic acid, methacrylic acid, acrylamide and methacrylamide. It will be appreciated that it is also possible to use mixtures of said monomers when preparing the emulsion copolymers (a), (b) and (c).

The copolymers (a) and (b), when used as binders in the paper coating compositions of the invention, may not be mixed in any desired proportions but the proportions of copolymers (a) and (b) must be such that a conventionally produced random copolymer prepared from the same amounts of the same monomers as are contained in the form of polymerized units in said copolymers (a) and (b) would have a glass temperature of from −20° to +30° C. in particular of from −15° to +25° C. For example, if the copolymer (a) is polystyrene and the copolymer (b) is poly(n-butyl acrylate), the proportion of polystyrene to poly(n-butyl acrylate) in the binder mixture must be such that a styrene/n-butyl acrylate random copolymer in which the amount of polymerized units of styrene and n-butyl acrylate correspond to the amounts of said polystyrene and poly(n-butyl acrylate) respectively has a glass temperature in the range stated.

If copolymer (a) contains 20 parts of polymerized units of n-butyl acrylate in addition to 80 parts of styrene and if copolymer (b) contains 90 parts of N-butyl acrylate and 10 parts of acrylonitrile, the binder mixture of the invention must contain copolymer (a) and copolymer (b) in such proportions that the total amount of polymerized units of styrene, n-butyl acrylate and acrylonitrile in the copolymers (a) and (b) gives random copolymers having glass temperatures ranging from −20° to +30° C. This condition similarly applies to the emulsion copolymers (c) prepared in two stages, that is, the total amounts of polymerized units of monovinyl aromatic monomers, acrylates and/or methacrylates and auxiliary monomers incorporated in the first and second stages must be such that a random copolymer made in convention manner from these monomers in the same quantities would have a glass temperature in the range −20° to +30° C. In this specification the term "glass temperature" has the usual meaning, i.e. it is the temperature at which the polymer changes from the solid vitreous state to the rubber-elastic state or the state of plastic flow. It is the temperature at which a kink occurs in the curve produced by plotting the specific volume against temperature. For further details on the glass temperature, reference is made to L. E. Nielson, "Mechanical Properties of Polymers," Reinhold Publishing Corp., New York, 1962, pp. 11 et seq.

Copolymers (a), (b) and (c) are prepared by polymerizing the monomers in aqueous emulsion by conventional methods in which, in particular, the monomer feed is gradual and conventional anionic and/or nonionic emulsifiers are used. Suitable emulsifiers are, for example, potassium n-dodecylsulfonate, sodium isooctylbenzenesulfonate, the reaction product of p-isooctylphenol with from 20 to 30 moles of ethylene oxide, which product may be sulfated if desired (in the form of the sodium or potassium salt), and sodium laurylsulfate, these emulsifiers being used in amounts of from about 0.2 to 5% by which based on the monomers. Suitable polymerization initiators are the usual free-radical generating compounds such as water-soluble peroxides, persulfates and azo compounds, e.g. potassium persulfate, cumene hydroperoxide, azodiisobutyrodiamide and azodiisobutyrodinitrile, these being used in quantities of from about 0.02 to 2% by weight based on the monomers. The polymerization temperatures used during the preparation of the copolymers are generally in the usual range, i.e. between about 50° and 90° C. They may be lower if use is made of redox catalysts or activated initiator systems, e.g. a system of potassium persulfate and ascorbic acid, sodium hydroxymethanesulfinate or triethanolamine. The dispersions are preferably prepared in concentrations ranging from 20 to 60% w./w. solids. In general, they should contain mutually compatible emulsifiers.

In the manufacture of the copolymer (c) to be prepared in two stages, the starting material may be an aqueous dispersion of a copolymer (a) and an aqueous dispersion of a copolymer (b). If, for example, the starting material is an aqueous dispersion of a copolymer (a), there are polymerized in this dispersion monomers which could also be used in the manufacture of an aqueous dispersion of copolymer (b), i.e. a mixture of from 80 to 100 parts of acrylate and/or methacrylate, from 0 to 20 parts of monovinyl aromatic monomers and/or acrylonitrile and from 0 to 10 parts of olefinically unsaturated monomer containing reactive groups. If the starting material is an aqueous dispersion of copolymer (b), there is polymerized therein, in emulsion, a mixture of from 65 to 100 parts of a mixture of the monovinyl aromatic monomers and from 0 to 20% by weight of said monomers of acrylonitrile, from 0 to 35 parts by weight of acrylate and/or methacrylate and from 0 to 10 parts by weight of olefinically unsaturated monomers containing reactive groups. The second stage of the process is advantageously carried out immediately after the first-stage copolymer has been produced, the monomers polymerized in the first stage preferably being those which are used in excess over the other monomers. Thus, for a given recipe of monomers in both stages, the initial polymerization is preferably carried out on those monomers which together form the major portion of all monomers used. In other words, if the amount of monomers to be polymerized in one stage is, for example, 100 parts and the amount of monomers to be polymerized in the other stage is only 50 parts, it is preferred to polymerize those monomers which weigh 10 parts in the first stage and to polymerize the monomers together weighing only 50 parts in the second stage.

Polymerization in the second stage is generally carried out in the manner usually employed for two-stage polymerizations, i.e. when the first-stage polymerization is complete further polymerization initiators, emulsifiers and, if desired, other auxiliaries are added and the monomers are then gradually fed to the mixture, generally in an emulsified form.

The desired technical effect is achieved irrespective of whether mixing of the aqueous dispersions of copolymers (a), (b) and, where used, (c) is carried out before or during the manufacture of the coating composition. The order in which the components of the coating composition are mixed is also insignificant as regards the properties of the coating composition or of the coated paper. It is advantageous, however, to form a premix of the aqueous dispersions of copolymers (a) and (b) and, where used, copolymer (c) in the desired proportions and to store said premix until required in the manufacture of the coating composition. These polymers are highly compatible with each other. The most favorable pH for the mixture is between 6 and 10, the base used for adjusting said pH being preferably ammonia.

The polymer dispersions of the invention are eminently suitable for use as binders in the manufacture of paper coating compositions, preferably together with other natural and/or synthetic binders. Before coating is carried out, said compositions are mixed in known manner with fillers or pigments, in particular china clay or in some cases titanium dioxide and sometimes synthetic pigments, e.g. those based on finely divided styrene polymers, and, if necessary, with other auxiliaries and are neutralized by the addition of alkali, e.g. sodium or potassium hydroxide or, preferably, ammonia.

The paper coating compositions of the invention may be applied to base papers by any of the known processes. Their particular advantage lies in the very high gloss which they impart to the coated papers and cards when treated by conventional calendering processes or the high-gloss process. In this property, they are superior to prior art paper coating compositions when used under similar conditions. Another advantage is that the ink receptivity of the papers thus coated decreases less markedly when the papers are polished (glazed) than in the case of papers which have been coated with conventional paper coating compositions. They are also distinguished by good water resistance and smoothness of the finished coating. These advantageous properties of the coating compositions could not have been foreseen.

In the following examples, the parts are by weight.

EXAMPLE 1

(a) Preparation of a binder polymer by two-stage emulsion polymerization

To a solution of 0.9 part of a mixture of $C_{16-18}$ alkylsulfates (sodium salts) in 300 parts of water, heated at 85° C., there is added, over 2 hours with stirring, an emulsion of 700 parts of styrene and 300 parts of n-butyl acrylate, 10 parts of acrylic acid, 20 parts of tetrasodium pyrophosphate, 8 parts of the sodium salt of a $C_{16-18}$ alkylsulfate and 5 parts of potassium persulfate in 760 parts of water. The temperature is maintained at 85° C. and, 1 hour after the monomer feed has terminated, the second stage is commenced, this consisting of the addition, over 90 minutes, of an aqueous emulsion of 400 parts of n-butyl acrylate, 4 parts of acrylic acid, 8 parts of tetrasodium pyrophosphate, 2 parts of potassium persulfate and 4 parts of the sodium salt of a $C_{16-18}$ alkylsulfate in 425 parts of water. Polymerization is allowed to continue for 2 hours at 85° C., after which the dispersion is cooled and its pH is adjusted to 8 by the addition of aqueous ammonia. The resulting dispersion has a solids content of 49% w./w.

(b) Coating composition and paper coating procedure

A coating composition is prepared by mixing 100 parts of china clay, 0.3 part of a conventional dispersing agent, 0.25 part of a conventional synthetic thickener and 35 parts of the dispersion prepared under (a) above (17 parts of polymer) with water to give a composition having a solids content of 50% w./w. and a pH of from 8 to 8.5. The coating composition is applied to wood-free base paper by means of an air brush at a rate of 15 g. of solid material per square meter. The coated paper is dried in the usual way and then smoothed on a 12-roll supercalender and also brushed with a triple-brush brushing machine. The gloss of the coated paper is measured after smoothing and also after brushing using a Zeiss goniophotometer at 45°/45°. The gloss of the smoothed paper is 12.4% and that of the smoothed and brushed paper is 13.9%.

EXAMPLE 2

(a) Preparation of binder (a1) Preparation of a copolymer (a): To a solution of 0.25 part of the sodium salt of a $C_{16-18}$ alkylsulfate in 60 parts of water, heated at 85° C., there is added, over 2 hours, an emulsion of 150 parts of styrene and 75 parts of n-butyl acrylate, 2.5 parts of acrylic acid, 5 parts of tetrasodium pyrophosphate, 2.25 parts of the sodium salt of a $C_{16-18}$ alkylsulfate and 1.25 parts of sodium persulfate in 205 parts of water and polymerization is continued at 85° C. for 2 hours after the addition of the monomers. After cooling, the pH is adjusted to 8 with aqueous ammonia. The resulting dispersion has a solids content of 49%.

(a2) Preparation of a copolymer (b): The procedure for the preparation of copolymer (a) is repeated except that in place of the mixture of 175 parts of styrene and 75 parts of n-butyl acrylate only 250 parts of n-butyl acrylate are used. There is thus obtained an aqueous dispersion of poly(n-butyl acrylate) having a solids content of 49%.

The binder is prepared by mixing 100 parts of the aqueous dispersion of the copolymer (a) with 40 parts of the aqueous dispersion of the copolymer (b).

(b) Coating composition and paper coating procedure 100 parts of china clay, 0.3 part of a conventional dispersing agent, 3 parts of a low-viscosity polyvinyl alcohol and 26.5 parts of the dispersion mixture prepared under (a) (13 parts of solid material) are mixed with water to give a coating composition having a solids content of 49% and a pH of from 8.5 to 9.

The coating composition is applied by air brush to a wood-free base paper and a duplex cardboard at a rate of 15 g. of solid material per square meter. The coated paper and cardboard are glazed by the high-gloss process using a highly polished cylinder heated at 125° C. There is thus obtained a coated paper having a gloss of 9.8% and a coated cardboard having a gloss of 19.8%.

(c) Comparative test

A mixture of equal parts of styrene and n-butyl acrylate are polymerized in aqueous emulsion under the conditions stated under (a1) above. The resulting 49% w./w. solids copolymer dispersion (random copolymer) is used to make a paper coating composition in the manner described under (1(b)) above, which is then used to prepare a coated paper. The gloss of paper is 5.7% after smoothing and 9.1% after smoothing and brushing.

EXAMPLE 3

(a) The procedure described in Example 2(b) is repeated except that a dispersion as prepared in Example 1(a) is used in place of the dispersion mixture prepared under 2(a) for the manufacture of the coating composition, which is applied to a wood-free base paper and a duplex cardboard in the manner described in Example 2(b). After glazing under the conditions described in Example 2, there is obtained paper having a gloss of 8.7% and a cardboard having a gloss of 15.7%.

(b) Comparative test

If the coating composition is prepared using a conventionally produced 50% aqueous dispersion of a random copolymer of equal parts of n-butyl acrylate and styrene in place of the dispersion prepared in Example 1(a), there is obtained a coated paper of only 4.5% and a coated card having a gloss of only 10.6%.

We claim:

1. An aqueous paper coating composition containing, for every 100 parts by weight of finely divided pigment, from 2 to 25 parts by weight of a synthetic binder comprising polymers of monovinyl aromatic monomers and acrylates of $C_{1-12}$ non-tertiary alkanols and/or methacrylates of $C_{4-12}$ alkanols, wherein the binder consists of (A) a mixture of
(a) an emulsion polymer of from 65 to 100% by weight of a mixture of monovinyl aromatic monomers and from 0 to 20% by weight of said monomers of acrylonitrile, from 0 to 35% of acrylates and/or methacrylates and from 0 to 10% by weight of olefinically unsaturated monomers containing reactive groups selected from the group consisting of monoethylenically unsaturated carboxylic acids containing 3 to 5 carbon atoms, their mono- and di-N-alkylamides, N-methylolamides, etherified N-methylolamides, maleic half esters and itaconic half esters, and (b) an emulsion polymer of from 80 to 100% by weight of acrylates and/or methacrylates, from 0 to 20% by weight of monovinyl aromatic monomers and/or acrylonitrile and from 0 to 10% by weight of olefinically unsaturated monomers containing reactive groups selected from the group consisting of monoethylenically unsaturated carboxylic acids containing 3 to 5 carbon atoms, their mono- and di-N-alkylamides, N-methylolamides, etherified N-methylolamides, maleic half esters and itaconic half esters, and/or (B) a polymer (c) which has been prepared in two stages and wherein monomers of polymer (b) or (a) have been emulsion polymerized in an aqueous dispersion of a polymer (a) or (b) respectively in the same quantities as those used in the manufacture of said polymers (b) or (a), the proportions of polymer (a) and polymer (b) and the proportions of the first and second stages of polymer (c) being such that the total quantities of monomers used are equal to the amounts of said monomers contained in a conventionally prepared random copolymer having a glass temperature of from −20° to +30° C.

2. A coating composition as set forth in claim 1 wherein said olefinically unsaturated monomers containing reactive groups are selected from the group consisting of acrylic acid, methacrylic acid, acrylamide and methacrylamide.

3. A coating composition as set forth in claim 2 wherein the amount of olefinically unsaturated monomers containing reactive groups is from 0.5 to 5% by weight.

4. A coating composition as set forth in claim 3 wherein said monovinyl aromatic monomer is styrene.

5. A coating composition as set forth in claim 4 wherein said acrylates and/or methacrylates are those of 2 to 8 carbon atoms containing nontertiary alkanols.

6. A coating composition as set forth in claim 1 in the form of an aqueous dispersion containing from 20 to 60% by weight of solids.

References Cited
UNITED STATES PATENTS

| | | | |
|---|---|---|---|
| 3,041,306 | 6/1962 | Baer | 260—45.5 |
| 3,041,307 | 6/1962 | Baer | 260—45.5 |
| 3,041,308 | 6/1962 | Baer | 260—45.5 |
| 3,041,309 | 6/1962 | Baer | 260—45.5 |
| 3,502,604 | 3/1970 | Nakatsuka et al. | 260—29.6 |
| 3,558,746 | 1/1971 | Sliwka et al. | 260—885 |
| 3,616,166 | 10/1971 | Kelley | 161—148 |

HAROLD D. ANDERSON, Primary Examiner

E. A. NIELSEN, Assistant Examiner

U.S. Cl. X.R.

260—881, 885

UNITED STATES PATENT AND TRADEMARK OFFICE
CERTIFICATE OF CORRECTION

PATENT NO. : 3,847,856
DATED : November 12, 1974
INVENTOR(S) : Gerhart Hermann Mueller and Kurt Wendel It is certified that error appears in the above-identified patent and that said Letters Patent are hereby corrected as shown below:

Column 1, in the heading, insert --Claims Priority, Application German, October 2, 1971, P 21 49 282.0--;

Column 4, line 52, delete "10 parts" and substitute --100 parts--;

Signed and Sealed this twentieth Day of January 1976

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. 3,847,856         Dated November 12, 1974

Inventor(s) Gerhart Hermann Mueller et al.

It is certified that error appears in the above-identified patent and that said Letters Patent are hereby corrected as shown below:

Column 2, lines 43 and 44, delete "3 to 12 parts by weight for every 100 parts by weight for every 100 parts by weight of pigment." and substitute -- 3 to 12 parts by weight for every 100 parts by weight of pigment. --.

Signed and Sealed this second Day of March 1976

[SEAL]

Attest:

RUTH C. MASON
Attesting Officer

C. MARSHALL DANN
Commissioner of Patents and Trademarks